Patented May 14, 1940

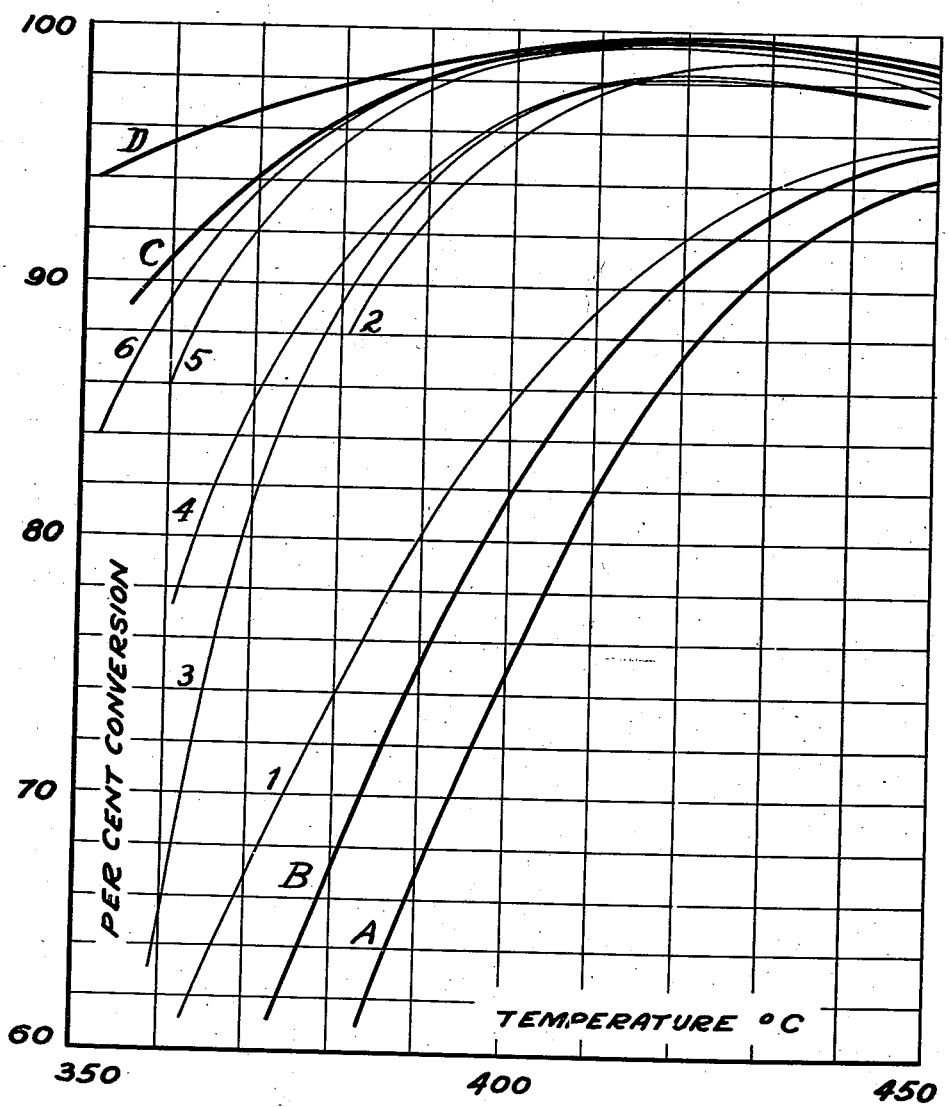

2,200,522

UNITED STATES PATENT OFFICE 2,200,522

CATALYZER AND METHOD OF PREPARING IT

Johann S. Streicher, Newark, N. J., assignor to The American Platinum Works, Newark, N. J., a corporation of New Jersey Application March 7, 1939, Serial No. 260,301

12 Claims. (Cl. 23—234)

My invention relates to catalysts, that is, to substances in the presence of which certain reactions, particularly between gases, will take place which in the absence of such catalysts would not occur at all or only under very special conditions. My invention also relates to methods of producing such catalysts. In particular, this invention relates to catalysts for the oxidation of $SO_2$ in the manufacture of sulfuric acid.

My present application is a continuation-in-part of my application filed in the United States Patent Office March 20, 1935, Serial No. 11,969.

Catalysts for the oxidation of $SO_2$ in the sulfuric acid manufacture consist of platinum deposited on a carrier. There can be distinguished two main groups in the methods of preparing such catalysts. In one group the platinum metal is precipitated on the carriers consisting of small pellets of substantially equal size having a smooth surface, any minute surface openings having been closed by special processes before the carrier is coated with the platinum, which is precipitated on the surfaces of such carriers as an extremely thin continuous layer, similar to the well-known bright platinum of the ceramic industry. In the other group the platinum metal is precipitated on carriers having an extremely large and irregular surface structure with untold possibilities in the way of cavities and elevations, so that these carriers contain the platinum not only on their surfaces but also throughout, similar to the distribution of the dye in vat-dyed cotton or wool.

Catalysts prepared in accordance with methods of the first group were complete failures as they required large amounts of platinum and were extremely sensitive to arsenic poisoning and were, furthermore, difficult to reactivate after having been arsenic poisoned. Catalysts prepared in accordance with methods of the second group were more satisfactory and are still in use, especially catalysts having carriers of asbestos or magnesium sulfate, which offer to the platinum metal an extremely large surface area within a very small space, particularly in the case of magnesium sulfate, thus permitting a finer subdivision of the platinum with the result that it is possible to use relatively small quantities of platinum, e. g. 0.3% by weight, in comparison with a relatively large volume of carrier. Such catalysts were, however, still sensitive to arsenic poisoning, although reactivation after poisoning was easier than in the case of catalysts prepared according to methods of the first group. Even the more recently developed catalysts produced from "promoted supports", i. e. carriers of asbestos or magnesium sulphate to which minor quantities of other chemical compounds were added before platinization, are susceptible to arsenic poisoning. These additions to the asbestos or magnesium sulphate carriers are intended to overcome the well-known pore surface sintering phenomena produced within these carriers in the presence of alkali salts, thus reducing or overcoming more or less the danger of self-inactivation of platinum catalysts containing alkali salts either in the carrier or in the catalyst.

Dehydrated granulated silica gel was recently added to the group of highly porous carriers. Such silica gel has a very stable pore structure if the granules are free from foreign substances, particularly alkali salts. As the pores of dehydrated silica gel are of ultra-microscopic size, the carrier has such a highly porous structure that its active surface area exceeds that of any other porous carrier, for which reason it has been suggested, based on experience gained from the use of the porous asbestos or magnesium sulfate carriers, to use only very small amounts of platinum in the production of platinum catalysts therefrom, for instance 0.125% and even 0.025% platinum by weight of the dehydrated silica gel carrier in comparison with 0.3% by weight of the magnesium sulfate carrier.

These silica gel platinum catalysts with the platinum in a highly dilute state however proved unsatisfactory. It was found that, for reasons unknown prior to my investigations, the quality varied greatly under apparently equal conditions. It was further ascertained that such catalysts developed very little activity when the flow rates were high, thus lacking the high overload capacity which is the most important and most valuable property of other platinum catalysts. For these and other reasons the silica gel catalysts did not become accepted in large scale sulfuric acid processes, and, being platinum catalysts, they were generally believed to be also subject to arsenic poisoning.

I have found that it is possible to produce, in accordance with my invention, platinum catalysts comprising a carrier of silica gel, platinized with small amounts of platinum, having great activity and conversion efficiency, and possessing a high overload capacity, while being immune to arsenic poisoning.

Experiments disclosed that the catalytic activity of silica gel platinum catalysts, particularly in the case of such catalysts containing not more than 0.3% platinum by weight, does not result solely from the catalytic activity of the finely divided platinum as is the case with catalysts in which the platinum is carried by asbestos or magnesium sulfate, and as has been generally assumed, but that it depends also to an important degree on the pore size and the pellet size of the dehydrated silica gel carrier.

I found that with silica gel pellets of the same size, the catalytic activity of the catalyst decreases with decreasing pore size and increases with increasing pore size. The pore size of dehydrated silica gel can be quantitatively expressed in terms of bulk density of the gel, provided approximately the same pellet size is referred to. With the same pellet size, greater bulk density indicates smaller pores. My experiments showed that the best results are obtained with silica gel catalysts if the carrier pellets have dimensions between 2 and 5 millimeters, i. e. are of such dimensions that they pass through a sieve of 6 meshes per linear inch, but are retained by a sieve of 12 meshes per linear inch, and if such pellets have a bulk density of not more than approximately 0.70. For instance, catalysts comprising dehydrated silica gel pellets of such dimensions but having a bulk density of 0.85 to 0.70, platinized with 0.3% platinum and less, are relatively inactive catalysts even with extremely small flow rates, while catalysts comprising pellets of the same dimensions, but having a bulk density of about 0.65 and smaller, also platinized with 0.3% platinum and less, produce satisfactory activity, even with relatively high flow rates.

Dehydrated silica gel pellets of more than 5 millimeters size show a considerable decrease in catalytic activity for any given pore size, unless they are platinized with large amounts of platinum. I found, however, that satisfactory results can be obtained even with dehydrated silica gel pellets having more than 5 millimeters size and platinized with about 0.3% platinum and less, if the ultra-microscopic pores are of medium or large size, equal to the size of the pores of pellets of less than 5 millimeters size and having a bulk density of less than approximately 0.70, and if the platinum is deposited on the surface layer of these large pellets and does not penetrate more than about 2 millimeters into the porous structure of these large pellets.

Carriers of dehydrated granular silica gel having the medium and large sized pores desired by me and essential for the attainment of the object of my invention are not of the extremely hard type of silica gel but of the comparatively soft type of silica gel, the silica gel known as hard having a small pore size.

Due to the inherent nature of the dehydrated silica gel carrier and its relatively closed porous structure, as compared with the relatively open but irregular surface structure of asbestos or magnesium sulfate, such silica gel carriers have, however, a somewhat restricted overload capacity. I have found that the small amount of platinum deposited on dehydrated silica gel catalysts having large and medium size pores, as above described, can be activated by other substances used in conjunction with the platinum. Such promoter substances are particularly the oxides and sulfates, or mixtures thereof, of vanadium, chromium, zirconium, tin, magnesium, iron, and even arsenic. The oxides of iron produce the greatest promoter effect. Practically all the other non-volatile metal oxides and the sulfates of the metals of groups 1 to 8 of the periodic system may also be used as promoters, particularly those which have some catalytic activity, although smaller than the catalytic activity of platinum, such as the stable oxides of metals of the groups 4 to 8 and the sulfates of metals of the groups 1 to 3 of the periodic system.

These promoters can display their full effect, however, only when the silica gel carrier, according to my invention, is first platinized, the total exposed surface produced by the ultra-microscopic pore structure serving to receive and hold nothing but the platinum, and if the promoter is then applied in such manner that it is superimposed upon and in loose association with the dehydrated platinized carrier with its characteristic ultra-filter structure caused by its ultra-microscopic pores so that the promoter is not used as a support of the platinum and does not in any case have the function of extending the total surface of the platinum metal.

Furthermore, the promoter should not contain any platinum in uncombined or metallic condition or any platinum compound that will be converted into such uncombined or metallic platinum during the operation of the catalyst.

It is due to the fact that the promoter is superimposed upon and only in loose association with the platinum of the catalyst, that arsenic oxides and other oxidic substances hitherto known as poisons for the platinum metal will not poison the catalyst according to my invention, but may even produce a distinct promoter effect.

The highest promoter effect is obtained when the catalysts do not contain more than 0.5% platinum, and is most pronounced at still lower percentages, such as less than 0.3%. For instance, my promoted platinized carriers containing 0.15% and 0.10% platinum show activities equal to those obtained with non-promoted catalysts containing about 1% of platinum. The increase in activity resulting from the use of promoters, according to my invention, becomes most evident with moderately high and with extremely high flow rates, for instance space velocities of more than about 200 liters gas mixture per liter catalyst per hour.

The promoters may be deposited chiefly or exclusively upon the outer surface of the platinized dehydrated carrier, or they may be deposited chiefly within the ultra-microscopic pores of the platinized dehydrated carrier. In each of these extreme cases, and in the intermediate cases, the promoters are always superimposed upon and in loose association with the platinum particles, whereas the platinum particles are in intimate and direct association with the carrier, the platinum in the metallic and finely divided state, for instance in the form of platinum black, having been definitely fixed upon and directly attached to the dehydrated carrier substance before any promoter was added. When the promoters are deposited on the outer surface of the platinized carrier, they are held in front of the ultra-microscopic pore openings which act like ultra-filters toward the relatively large particles of the promoters, while those promoter particles which are slightly smaller than the pore openings will protrude slightly into the openings and may occasionally touch some platinum particles deposited on the carrier. In the other case where the promoters penetrate into the ultra-microscopic pores of the platinized carrier, the solid substances, i. e. carrier, platinum and promoter, just meet each other within these pores with their individual surfaces and are held in that position by the ruggedness of the dehydrated carrier, without ever forming a mixture with each other, either mechanically or chemically, the platinum forming a deposit on the carrier, and the promoter forming an individual deposit on the carrier and on the platinum.

Generally the addition of 1% of promoter per weight of platinized catalyst is sufficient to produce the high activation effect, although the amount of promoter may vary within wide limits and may be increased nearly to the mechanical saturation point of the carrier.

My new catalysts, with or without promoters, can be made from any dehydrated, including partially dehydrated, silica gel of the hereinabove described structure, or from silica gel which is precipitated upon kieselguhr or celite and which is transformed by the well-known washing procedures into the medium and large pore structure before dehydation. The platinum is best deposited by soaking the dehydrated silica gel with a solution of platinum chloride, $H_2PtCl_6$, about 38% to 40% platinum, although other soluble platinum compounds, such as alkali platinum chlorides, including ammonium platinum chloride, or barium platinum cyanide can be used. Compounds which may be formed on the gel as the result of the decomposition of the platinum compound, e. g. alkali chlorides in the case of alkali platinum chloride, or barium oxide in the case of barium platinum cyanide, should be washed out or otherwise removed before the catalyst is loaded with the promoter. The solution containing the platinum compound can be prepared with either water or alcohol or mixtures thereof with a low surface tesion. In order that a minimum volume of these solutions may suffice for treating the dehydrated silica gel, including silica gel which is precipitated on kieselguhr and transformed into the medium and large pore structure, only part of the silica gel is soaked with the entire amount of solution and then the remainder of the silica gel is stirred into the thoroughly wet mass. The alcohol solutions or aqueous solutions having a low surface tension have a high capillary activity so that the platinization can be carried out with a minimum amount of liquid. Furthermore, the original structure of the gel is least disturbed and the silica gel pellets keep their original strength during the platinizing process and a minimum amount of powder or fines is formed.

The silica gel soaked with the platinum solution is dried at temperatures from 60 to 100° C., preferably starting with the lower temperature and finishing with the higher temperature, and thereafter is heated to a temperature not exceeding 600° C., preferably not exceeding 450° C., to decompose the platinum compound to platinum. With this method platinization over the complete inner surface of the silica gel is effected, particularly in the case of pellets from 2 to 5 millimeters size.

In the case of pellets larger than 5 milimeters the surface platinization, in accordance with my invention, is best effected by first soaking the dehydrated silica gel with a dilute solution of mucilage, such as gum arabic or gum tragacanth, drying the silica gel and the mucilage at temperatures below the decomposition temperature of the mucilage, treating the dried silica gel in the hot state with an alcoholic solution of the platinum compound and heating the silica gel and the solution to about 450° C. to decompose the platinum compound and the mucilage. In another method silica gel heated to about 100 to 200° C. is treated with a mixture of mucilage and platinum compound and then heated to about 450° C. In still another method the hot dehydrated silica gel is treated with an alcohol-ether mixture containing the platinum compound in such a manner that practically all the alcohol-ether mixture is evaporated by the latent heat of the silica gel as soon as the solution is poured over the gel. Whichever method is employed, compounds (ashes) which result from the decomposition of the mucilage should be washed out or otherwise removed before the catalyst is loaded with the promoter.

Instead of alcohol, I may also use in any of my methods any other organic liquid, preferably one having a low surface tension, in which a platinum compound is soluble.

The dehydrated platinized silica gel preparations are best loaded with the promoter by treating them, after cooling, with finely divided oxide powder or with suspensions which contain oxidic powders in finely divided state, or with such salt solution which when dried and heated produce activating oxides or oxide mixtures or activating sulfates. The suspensions or solutions are best prepared with water or alcohol or mixtures thereof; other organic liquids may also be used instead of or in conjunction with the alcohol.

It is of vital importance that the carrier of dehydrated silica gel should be first platinized and then loaded with the promoter, as described by me, and that the carrier of silica gel should be of a granular nature. Any other method of loading the catalyst with the promoter, such as platinizing and loading with the promoter at the same time, or first loading the carrier with a promoter and then platinizing, would not produce the results described by me, as the characteristic superimposition of the promoter and the loose association thereof with the platinum and the carrier would not be obtained. Furthermore, the promoting effects described by me can be obtained only if the silica gel pores are absolutely preserved in their characteristic state and are not destroyed by the incorporation of foreign detrimental substances, such as clay and the like, into the not fully dehydrated silica gel. Also the promoter must not comprise compounds, such as aluminum oxide or aluminum sulfate, which at temperatures encountered in the catalytic operation expand more than the silica gel carrier, as in such cases the ultra-microscopic structure of the silica gel carrier is destroyed, fines are formed and the platinum would become subject to arsenic poisoning.

The effects obtained by my invention can be achieved only with carriers of silica gel such as hereinbefore specified. It is not possible to use such other carriers as chromia gel, tungstia gel, titania gel, alumina gel, stannia gel and the like, or mixtures thereof with silica gel, since such gels are not resistant to temperature and furthermore tend to act as catalysts and not as a neutral carrier which preserves its ultra-microscopic structure up to the highest operative temperatures. It is also not possible to use carriers consisting exclusively of kieselguhr, porous clay, etc., as such carriers would act in a manner similar to that of asbestos or magnesium sulfate. Kieselguhr can be used only as a reinforcing carrier for silica gel under conditions as described by me, that is when the silica gel is deposited on kieselguhr during its preparation and the silica gel is strictly transformed into the described pore size and structure, and the kieselguhr is not mixed or kneaded into the still hydrated and washed gel, a procedure which would destroy the ultra-microscopic structure of the silica gel.

I will now give a few illustrative examples showing how my invention may be carried out in practice.

Example 1

A platinized silica gel containing 0.125% platinum (by weight) is prepared from a silica gel with a bulk density of 0.583 (one liter of this gel weighs 583 grams). To obtain this platinized silica gel 0.73 gram platinum have to be precipitated upon one liter of this silica gel. The silica gel in granular form is treated with a platinum chloride solution which contains this amount of platinum per each 300 cubic centimeters (0.73 gram per each 300 cubic centimeter solution). Standard C. P. (chemically pure) platium chloride analyzing from 38 to 40% platinum is used to make this solution; the platinum chloride is dissolved in water containing 10% ethyl alcohol. This platinum chloride solution is sprayed upon, and stirred into, the dry silica gel, using 300 cubic centimeter solution for each liter (or each 583 grams) of silica gel. A completely wetted silica gel is obtained. This mixture is now dried at temperatures of from 60 to 100° C., starting with the lower temperature and finishing with the higher temperature. This dry silica gel now contains platinum chloride or platinous chloride within its pores; these platinum compounds are most evenly divided all over the extremely fine capillarities of the silica gel; these platinum chlorides are decomposed to form platinum black, by heating this dry silica gel mass in an open, electrically heated muffle to temperatures from 300 to 400° C. The resulting granular platinized silica gel mass contains approximately 0.125% platinum and is completely dehydrated. This mass enables me to produce the following conversions with a gas mixture containing 7.0% $SO_2$, 19.5% $O_2$, 73.5% $N_2$ when this gas mixture is driven through the catalytic mass with the space velocities of 200, 1000, 2000, or 4000 respectively:

| | Space velocities | | | |
|---|---|---|---|---|
| | 200 | 1000 | 2000 | 4000 |
| | Per cent $SO_3$ | Per cent $SO_3$ | Per cent $SO_3$ | Per cent $SO_3$ |
| Temperature, °C.: | | | | |
| 285 | 45.5 | | | |
| 325 | 83.4 | 42.9 | | |
| 360 | 97.6 | 86.1 | 56.0 | |
| 420 | 98.8 | 97.5 | 90.3 | 61.2 |
| 465 | 96.7 | 97.1 | 96.0 | 86.3 |
| 550 | 88.0 | 88.2 | 88.7 | 88.6 |

As space velocities increase, the conversion rate decreases considerably; the purely platinized catalyst containing minute amounts of platinum therefore has only a restricted overload capacity.

The same platinized silica-gel as referred to at the beginning of Example 1, that is to say platinized dehydrated silica gel containing .125% of platinum, may be wetted while stirring with a suspension of finely divided iron oxide (made from carbonyl-iron) in water; through this procedure about 1% ferric oxide, by weight, is precipitated upon the platinized silica gel; the mixture is dried in an air current at temperatures of from 60 to 100° C. and finally heated in an open, electrically heated muffle to temperatures of from 300 to 400° C. This new mass enables me to obtain the following conversions with a gas mixture containing 7.0% $SO_2$, 19.5% $O_2$, 73.5% $N_2$ when this gas mixture is carried through this mass with space velocities of 200, 1000 or 2000 respectively:

| Space velocities | | | | | |
|---|---|---|---|---|---|
| 200 | | 1000 | | 2000 (see curve 6) | |
| Temp., °C. | Per cent $SO_3$ | Temp., °C. | Per cent $SO_3$ | Temp., °C. | Per cent $SO_3$ |
| 310 | 71.7 | | | | |
| 319 | 82.1 | | | | |
| 332 | 91.1 | 329 | 64.1 | 332 | 20.8 |
| 342 | 97.5 | 337 | 77.0 | 346 | 74.7 |
| 346 | 98.1 | 349 | 91.6 | 348 | 79.2 |
| 354 | 99.6 | 358 | 94.6 | 358 | 88.5 |
| 386 | 99.5 | 364 | 96.9 | 372 | 94.8 |
| | | 394 | 98.9 | 386 | 97.8 |
| | | | | 434 | 98.9 |

The increase in activity caused by the addition of iron oxide is quite remarkable, especially at the higher and extremely high space velocities. The new catalytic mass develops its highest activity around 400 to 430° C. where maximum conversions are possible.

Example 2

The platinized dehydrated silica-gel prepared according to the method outlined in Example 1 and containing 0.125% platinum, is sprayed (under stirring) with so much of a solution of ferrous sulfate as to produce upon the platinized silica-gel an approximately 1% $Fe_2O_3$ deposit when the mass is dried (at 60 to 100° C.) and finally heated in an open muffle (between 300 to 600° C.) to transform the ferrous sulfate into ferric oxide. When placed within a converter through which is passed a gas mixture containing 7.0% $SO_2$, 19.5% $O_2$ and 73.5% $N_2$, this catalyst mass produces the following conversions:

| Space velocities | | | |
|---|---|---|---|
| 200 | | 1000 | |
| Temp., °C. | Per cent $SO_3$ | Temp., °C. | Per cent $SO_3$ |
| 318 | 91.2 | | |
| 340 | 97.2 | 342 | 85.6 |
| | | 346 | 89.6 |
| | | 352 | 91.5 |
| | | 370 | 96.3 |
| | | 374 | 97.5 |
| 384 | 99.4 | 388 | 97.5 |
| 400 | 98.8 | 392 | 97.8 |
| | | 418 | 98.1 |

Iron oxide produced from ferrous sulfate upon the platinized silica gel causes the same promoter effect as any finely divided ferric oxide which is as such directly added to the platinized silica gel.

Example 3

The platinized dehydrated silica gel prepared according to the method outlined in Example 1 and containing 0.125% platinum is wetted (under stirring) with water containing vanadium pentoxide powder; approximately 1% (by weight) $V_2O_5$ is thus added to the dry platinized silica gel. The dried mass is placed in the converter; with a gas mixture containing 7.0% $SO_2$, 19.5% $O_2$ and 73.5% $N_2$ this mass produces the following conversions:

| Space velocities | | | | | |
|---|---|---|---|---|---|
| 200 | | 1000 | | 2000 (see curve 3) | |
| Temp., °C. | Per cent $SO_3$ | Temp., °C. | Per cent $SO_3$ | Temp., °C. | Per cent $SO_3$ |
| 298 | 44.7 | | | | |
| 314 | 77.3 | | | | |
| 329 | 89.6 | 325 | 37.1 | | |
| 342 | 94.1 | 332 | 59.0 | | |
| 370 | 98.4 | 356 | 92.3 | 356 | 46.3 |
| | | 362 | 94.2 | 358 | 58.7 |
| | | | | 368 | 79.0 |
| | | 380 | 96.7 | 377 | 86.9 |
| | | 385 | 96.9 | 396 | 96.7 |
| 406 | 98.9 | 420 | 98.3 | 412 | 96.9 |
| | | | | 419 | 96.9 |

The same conversion rates are obtained and the same activity is produced when the platinized silica gel is wetted with sulfuric acid containing the vanadic acid in solution, which sulfuric acid is subsequently volatilized.

Example 4

A platinized dehydrated silica gel prepared according to the method outlined in Example 1 and containing 0.125% platinum, is wetted (under stirring) with water which contains chromium sesquioxide in suspension; about 1% chromium sesquioxide powder (by weight) is thus added to the platinized silica gel. The wetted mass is dried at temperatures of from 60 to 100° C. to deposit the chromium oxide upon the platinized silica gel. This mass produces the following conversions when a gas mixture containing 7.0% $SO_2$, 9.5% $O_2$, 73.5% $N_2$ is carried through this catalytic mass:

| Space velocities | | | | | |
|---|---|---|---|---|---|
| 200 | | 1000 | | 2000 (see curve 5) | |
| Temp., °C. | Per cent $SO_3$ | Temp., °C. | Per cent $SO_3$ | Temp., °C. | Per cent $SO_3$ |
| 306 | 64.0 | | | | |
| 318 | 79.1 | 312 | 38.8 | | |
| 330 | 89.4 | 330 | 66.0 | | |
| 333 | 91.4 | 332 | 69.5 | | |
| 348 | 96.6 | 342 | 82.7 | | |
| | | 344 | 85.5 | 344 | 56.6 |
| 366 | 99.0 | 360 | 94.1 | 354 | 77.9 |
| 380 | 99.1 | 380 | 97.7 | 370 | 94.3 |
| | | | | 384 | 96.9 |
| 428 | 99.0 | 416 | 98.7 | 422 | 99.0 |

Chromium oxide as a promoter causes nearly as high an activation of the platinum upon silica gel as iron oxide.

Example 5

The platinized dehydrated silica gel prepared according to the method outlined in Example 1 and containing 0.125% platinum is wetted (under stirring) with a concentrated solution of magnesium sulfate and afterwards dried (between 60 and 150° C.); this process is repeated until the silica gel is loaded with about 7.5% magnesium sulfate constituting a promoter. This mass is put into the converter and treated with a gas mixture which contains 7.0% $SO_2$, 19.5% $O_2$, 73.5% $N_2$. The following conversions are produced:

| Space velocities | | | | | |
|---|---|---|---|---|---|
| 200 | | 1000 | | 2000 (see curve 4) | |
| Temp., °C. | Per cent $SO_3$ | Temp., °C. | Per cent $SO_3$ | Temp., °C. | Per cent $SO_3$ |
| 300 | 60.0 | | | | |
| 313 | 77.7 | 314 | 49.8 | | |
| 318 | 82.7 | 321 | 68.4 | | |
| 330 | 91.9 | | | | |
| 336 | 94.2 | 342 | 85.7 | 339 | 48.3 |
| 346 | 97.3 | 348 | 90.3 | 346 | 58.7 |
| 369 | 98.6 | | | 366 | 82.0 |
| | | 378 | 98.4 | | |
| 380 | 99.2 | 398 | 98.2 | 395 | 95.8 |
| | | 431 | 98.4 | 426 | 97.8 |
| | | | | 456 | 97.6 |

This mass is not poisoned by arsenic compounds as are all the masses where magnesium sulfate is either used exclusively as the carrier for the platinum or where magnesium sulfate is used as an additional support for the platinum to extend the total surface of the catalyst (platinum).

Example 6

To the platinized dehydrated silica gel prepared according to the method outlined in Example 1 and loaded with about 7.5% magnesium sulfate according to Example 5 is applied an additional promoter by spraying the dry mass (under stirring) with a suspension of arsenic pentoxide in water (such arsenic pentoxide amounting to 1% of the silica gel). This mass is dried (between 60 and 100° C.), then transferred to the converter and treated with a gas mixture containing 7.0% $SO_2$, 19.5% $O_2$, 73.5% $N_2$; the mass produces the following conversions:

| Space velocities | | | | | |
|---|---|---|---|---|---|
| 200 | | 1000 | | 2000 | |
| Temp., °C. | Per cent $SO_3$ | Temp., °C. | Per cent $SO_3$ | Temp., °C. | Per cent $SO_3$ |
| 308 | 73.6 | | | | |
| 326 | 93.9 | 318 | 58.7 | | |
| 338 | 96.4 | 338 | 83.6 | | |
| 360 | 99.2 | 364 | 95.3 | 370 | 83.7 |
| | | 376 | 97.4 | 378 | 88.9 |
| | | 396 | 98.3 | 395 | 96.2 |
| | | | | 414 | 97.9 |
| | | | | 454 | 97.2 |

The results at a space velocity of 2000 are practically identical with those represented by curve 4. The addition of a second promoter (in this case arsenic pentoxide) to an activated mass does not change the original activity of the mass. The conversions attained are the same as those produced by the first and already highly efficient promoter. The arsenic compound does not act as a catalytic poison upon the platinum.

Example 7

Platinized dehydrated silica gels containing 5.00%, 1.00%, 0.125% and 0.100% platinum are prepared according to the method applied in Example 1. These platinized silica gels produce with a gas mixture containing 7.0% $SO_2$, 19.5% $O_2$, 73.5% $N_2$ the following conversions when the gas mixture is passed through the catalysts with a space velocity of 1000:

Space velocity, 1000

| Platinum | | | | | | | |
|---|---|---|---|---|---|---|---|
| 0.100% | | 0.125% | | 1.000% | | 5.000% | |
| Temp., °C. | Per cent SO₃ | Temp., °C. | Per cent SO₃ | Temp., °C. | Per cent SO₃ | Temp., °C. | Per cent SO₃ |
| | | | | | | 298 | 60.7 |
| | | | | 306 | 60.6 | 306 | 75.1 |
| | | | | 313 | 73.4 | | |
| | | | | 318 | 80.9 | 318 | 88.2 |
| | | 325 | 42.9 | 322 | 84.3 | 325 | 91.1 |
| | | | | 336 | 93.4 | 338 | 95.9 |
| 348 | 55.0 | | | 344 | 95.4 | 344 | 97.7 |
| 354 | 62.1 | | | 352 | 97.2 | 372 | 98.6 |
| 382 | 87.8 | 369 | 86.1 | 396 | 98.5 | 406 | 99.3 |
| 419 | 96.0 | 420 | 97.5 | | | | |
| 433 | 96.9 | 465 | 97.1 | | | | |
| 450 | 96.9 | | | | | | |

The four kinds of platinized dehydrated silica gel referred to at the beginning of Example 7 may be sprinkled with arsenic pentoxide and water (under stirring); I thus add arsenic pentoxide in an amount of about 1% (by weight) of the silica gel; the masses are dried (between 60 and 100° C.) and transferred to the converter. They are loaded with a gas mixture containing 7.0% $SO_2$, 19.5% $O_2$, 73.5% $N_2$ at a space velocity of 1000. The following conversions are obtained:

Space velocity, 1000
Arsenic pentoxide, about 1%

| Platinum | | | | | | | |
|---|---|---|---|---|---|---|---|
| 0.100% | | 0.125% | | 1.000% | | 5.000% | |
| Temp., °C. | Per cent SO₃ | Temp., °C. | Per cent SO₃ | Temp., °C. | Per cent SO₃ | Temp., °C. | Per cent SO₃ |
| | | | | | | 302 | 65.4 |
| | | | | 305 | 60.0 | 304 | 73.3 |
| | | | | | | 310 | 84.9 |
| | | | | | | 321 | 92.3 |
| | | | | 329 | 88.9 | 336 | 97.8 |
| 348 | 64.0 | | | 358 | 98.2 | 346 | 99.1 |
| 360 | 74.1 | 362 | 91.0 | 372 | 99.0 | 374 | 99.2 |
| 377 | 86.9 | 390 | 98.5 | | | 400 | 99.1 |
| 396 | 93.4 | 398 | 98.1 | | | | |
| 421 | 96.4 | 406 | 98.1 | | | | |
| | | 450 | 97.2 | | | | |

The drawing shows at 1 to 6 examples of the conversion curves obtained with some of the best promoter substances. These conversion curves are obtained with the gas mixture moving through the catalysts with a space velocity of 2000; the gas mixture used contained 7.0% $SO_2$, 19.5% $O_2$, and 73.5% $N_2$. The drawing also shows at A, B, C for the sake of comparison, curves representing conversions which are obtained with the only-platinized silica gels, that is, platinized silica gels without a promoter, under the very same conditions of space velocity and gas mixture composition. Another comparison curve is shown at D.

Curve A corresponds to the silica gel with 0.100% Pt.
Curve B: silica gel with 0.125% platinum.
Curve C: silica gel with 1.000% platinum.
Curve D: platinized asbestos with 10.0% platinum and with the space velocity 90; this curve represents the theoretical conversion curve (the same gas mixture composition being assumed).
Curve 1: silica gel with 0.1% platinum and activated with arsenic pentoxide.
Curve 2: silica gel with 0.125% platinum and activated with arsenic pentoxide.
Curve 3: silica gel with 0.125% platinum and activated with vanadium pentoxide.
Curve 4: silica gel with 0.125% platinum and activated with magnesium sulfate.
Curve 5: silica gel with 0.125% platinum and activated with chromium sesquioxide.
Curve 6: silica gel with 0.125% platinum and activated with ferric oxide.

Curves 5 and 6 represent approximately the results obtained with Example 7.

The term "promoter agent" as used in the specification and the appended claims is to be interpreted as including an agent containing or consisting of a single promoter substance, as well as one containing or consisting of two or more such substances.

The platinum is generally employed in the condition of chemically pure platinum. However, minor amounts of other metals of the platinum group may be present without impairing the result.

It will be understood that the loose or porous character of the promoter permits the reacting gases to penetrate into contact with the underlying platinum.

Various modifications may be made without departing from the nature of my invention.

Having now described my said invention, I claim:

1. The method of preparing catalysts which comprises adding to dehydrated granular silica gel a solution containing a platinum compound, drying the resulting mixture, heating the mixture to decompose the platinum compound, cooling the resulting platinized silica gel, wetting and mixing the said platinized silica gel with a liquid containing a promoter agent, allowing the said promoter agent to settle on the platinized silica gel and within its pores in a loose state and in loose association with said platnized silica gel, and drying the resulting mass.

2. The method of preparing catalysts which comprises adding to dehydrated granular silica gel pellets having dimensions permitting their passage through a sleeve having 6 meshes per linear inch and having a bulk density of up to 0.70, a solution containing a platinum compound, slowly drying the resulting mixture, heating the mixture to decompose the platinum compound, cooling the resulting platinized silica gel, wetting and mixing the said platinized silica gel with a liquid containing a promoter agent, allowing the said promoter agent to settle on the platinized silica gel and within its pores in a loose state and in loose association with said platinized silica gel, and drying the resulting mass.

3. The method of preparing catalysts which comprises adding to dehydrated granular silica gel pellets having dimensions permitting their passage through a sieve having 6 meshes per linear inch and preventing their passage through a sieve having 12 meshes per linear inch and having a bulk density of up to 0.70, a solution containing a soluble platinum compound, slowly drying the resulting mixture, heating the mixture to decompose the platinum compound, cooling the resulting platinized silica gel, wetting and mixing the said platinized silica gel with a liquid containing a promoter agent, allowing the said promoter agent to settle on the platinized silica gel and within its pores in a loose state and in loose association with said platinized silica gel, and drying the resulting mass.

4. The method of preparing catalysts which comprises adding to dehydrated granular silica gel having a large pore structure, a solution containing a platinum compound, drying the resulting mixture, heating the mixture to decompose the platinum compound, cooling the resulting platinized silica gel, wetting and mixing the said platinized silica gel with a liquid containing a promoter agent, allowing the said promoter agent to settle on the platinized silica gel and within its pores in a loose state and in loose association with said platinized silica gel, and drying the resulting mass.

5. The method of preparing a catalyst which comprises adding to dehydrated granular silica gel, a platinum compound solution in a quantity not more than sufficient to completely wet the silica gel, drying the resulting mixture at temperatures of from 60 to 100° C., slowly heating this mixture to a point not exceeding 600° C., cooling the resulting platinized silica gel, wetting and mixing said platinized silica gel with a liquid containing a promoter agent, allowing the promoter agent to settle upon the platinized silica gel and within its pores in a loose state and in loose association with said platinized silica gel, drying the resulting mass at temperatures of from 60 to 100° C., and slowly heating the mass to a point not exceeding 600° C.

6. The method of preparing a catalyst which comprises adding to dehydrated granular silica gel, a platinum compound solution in a quantity not more than sufficient to completely wet the silica gel, drying the resulting mixture at temperatures of from 60 to 100° C., slowly heating this mixture to a point not exceeding 600° C., cooling the resulting platinized silica gel, wetting said platinized silica gel with a suspension containing an oxidic promoter agent, drying the resulting mixture at temperatures of from 60 to 150° C. to deposit upon said platinized silica gel and within its pores the promoter agent superimposed upon the platinum, and slowly heating the mass to a point not exceeding 600° C.

7. The method of preparing a catalyst which comprises adding to dehydrated granular silica gel, a platinum compound solution in a quantity not more than sufficient to completely wet the silica gel, drying the resulting mixture at temperatures of from 60 to 100° C., slowly heating this mixture to a point not exceeding 600° C., cooling the resulting platinized silica gel, wetting said platinized silica gel with a solution containing a promoter agent, drying the resulting mixture at temperatures of from 60 to 150° C. to deposit upon said platinized silica gel and within its pores the promoter agent superimposed upon the platinum, and slowly heating the mass to a point not exceeding 600° C., and then repeating the wetting of the platinized silica gel with the promoter solution and the above named subsequent steps until the platinized gel is saturated with the promoter agent.

8. An activated catalytic platinum mass comprising a carrier consisting of dehydrated silica gel having large pores, a platinum catalyst proper on said carrier in intimate and direct association with said carrier's porous structure but not penetrating more than 2 millimeters into said carrier, and superimposed on said platinized carrier and in loosely adhering association therewith a deposit of a promoter agent for the platinum.

9. An activated catalytic platinum mass comprising a carrier consisting of dehydrated silica gel having large pores, a platinum catalyst proper on said carrier in intimate and direct association with said carrier's porous structure but not penetrating more than 2 millimeters into said carrier, and superimposed on said platinized carrier and in loosely adhering association therewith a deposit of a promoter agent for the platinum, said promoter agent comprising a non-volatile oxide of a metal taken from the groups 1 to 8 of the periodic system.

10. An activated catalytic platinum mass comprising a carrier consisting of dehydrated silica gel having large pores, a platinum catalyst proper on said carrier in intimate and direct association with said carrier's porous structure but not penetrating more than 2 millimeters into said carrier, and superimposed on said platinized carrier and in loosely adhering association therewith a deposit of a promoter agent for the platinum, said promoter agent comprising a sulfate of a metal taken from the groups 1 to 8 of the periodic system.

11. An activated catalytic platinum mass comprising a carrier consisting of dehydrated silica gel pellets having dimensions permitting their passage through a sieve having 6 meshes per linear inch and having a bulk density of not more than approximately 0.70, a platinum catalyst proper on said carrier in intimate and direct association with said carrier's porous structure, and superimposed on said platinized carrier and in loosely adhering association therewith a deposit of a promoter agent for the platinum.

12. An activated catalytic platinum mass comprising a carrier consisting of dehydrated silica gel pellets having 6 meshes per linear inch and having a bulk density of not more than approximately 0.70, a platinum catalyst proper on said carrier in intimate and direct association with said carrier's porous structure, said platinum catalyst proper constituting not more than about 0.50% by weight of the catalytic mass, and superimposed on said platinized carrier and in loosely adhering association therewith a deposit of a promoter agent for the platinum.

JOHANN S. STREICHER.